United States Patent [19]

Levi

[11] Patent Number: 6,099,231

[45] Date of Patent: Aug. 8, 2000

[54] DRIVE UNIT FOR MOTOR VEHICLE LADDER RACK

[76] Inventor: Avraham Y. Levi, 757 Decorah La., St. Paul, Minn. 55120

[21] Appl. No.: 09/158,680

[22] Filed: Sep. 22, 1998

Related U.S. Application Data

[60] Provisional application No. 60/059,425, Sep. 22, 1997.

[51] Int. Cl.[7] .................................................... B60P 9/00
[52] U.S. Cl. ............................................. 414/462; 224/310
[58] Field of Search .................................. 414/462, 546; 224/310, 315, 324

[56] References Cited

U.S. PATENT DOCUMENTS

| | | | |
|---|---|---|---|
| 4,826,387 | 5/1989 | Audet | 414/462 |
| 5,054,578 | 10/1991 | Smillie, III | 414/462 |
| 5,262,706 | 11/1993 | Hollingsworth | 414/462 |
| 5,297,912 | 3/1994 | Levi | 414/462 |
| 5,850,891 | 12/1998 | Olms et al. | 414/462 |

*Primary Examiner*—Gregory A. Morse
*Attorney, Agent, or Firm*—Nikolai, Mersereau & Dietz, P.A.

[57] ABSTRACT

A ladder rack adapted to be affixed to the roof of a utility vehicle is equipped with a DC motor powered drive which, when actuated, controls the movement of ladders from a location on the vehicle roof to a location alongside the body of the vehicle. The drive includes a DC motor driven lead screw having a traveling nut thereon coupled to an endless chain deployed about a sprocket on an output shaft and a sprocket on an idler shaft such that rotation of the lead screw drives the output shaft. That output shaft is, in turn, coupled to a connecting rod of the ladder rack.

9 Claims, 3 Drawing Sheets

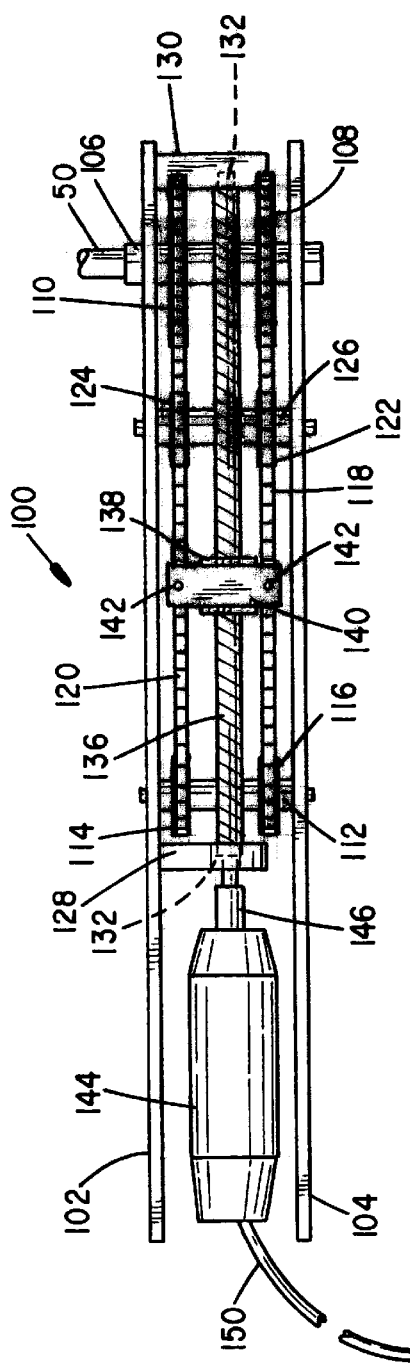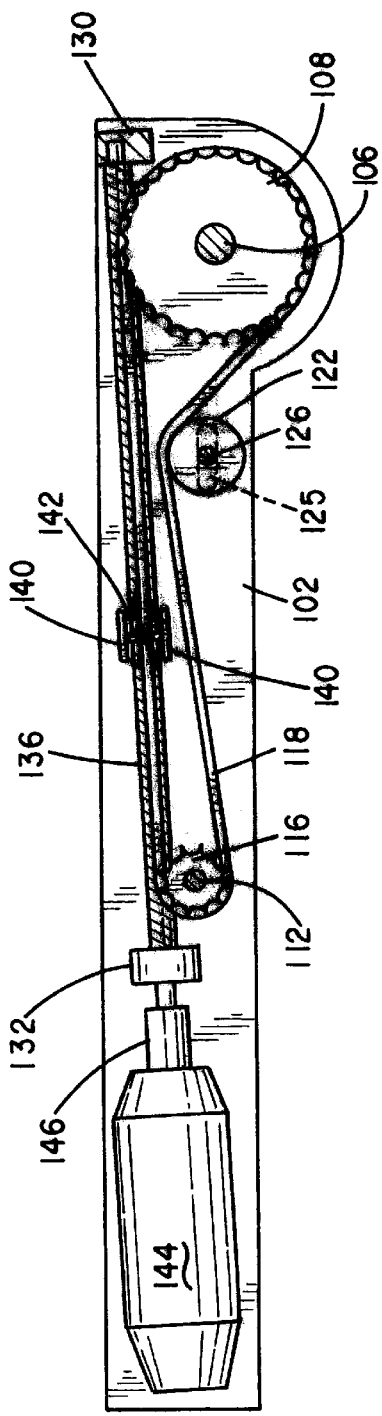

6,099,231

DRIVE UNIT FOR MOTOR VEHICLE LADDER RACK

CROSS-REFERENCE TO RELATED APPLICATIONS

This application claims priority to Provisional Application Serial No. 60/059,425, filed Sep. 22, 1997.

BACKGROUND OF THE INVENTION

1. Field of the Invention

This invention relates generally to labor-saving devices for use in loading and unloading heavy ladders on to and from the roof of a motor vehicle, such as a van or utility truck, and more particularly to a motorized assembly having a low profile and the requisite torque for actuating the ladder rack.

2. Discussion of the Prior Art

My earlier U.S. Pat. No. 5,297,912, the text of which is hereby incorporated by reference, discloses a ladder rack for motor vehicles that facilitates the loading and unloading of heavy ladders from the roof of a motor vehicle that comprises a pair of four-bar linkages that are appropriately affixed to transversely extending luggage rack members secured to the roof of the vehicle. A connector rod is operatively coupled between the pair of four-bar linkages where that connector rod is adapted to be rotated either by a crank or other suitable drive member for elevating and rotating the load from a position parallel to the roof of the vehicle to a disposition aligned with one side of the vehicle where they can readily be removed for use.

The present invention is concerned with a power unit that I have designed which can conveniently fit along side one of the four-bar linkage members on the roof of the vehicle without projecting significantly above the roof-mounted ladder rack and which is capable of delivering the requisite torque to the connector rod to thereby elevate and rotate of pair of heavy ladders so that they move from their position atop the vehicle to a position along the side of the vehicle and vice versa.

SUMMARY OF THE INVENTION

A motor powered drive for a vehicle mounted ladder rack of the type having a rotatable connecting rod coupled to a pair of parallel, spaced-apart four bar linkages where one linkage of each of the pair of four bar linkages is a ladder support member includes a DC motor operatively coupled through a torque amplifying transmission to the rotatable connecting rod allowing ladders to be transported from the roof of a vehicle to a location along side the vehicle and vice versa.

The torque amplifying transmission comprises a motor driven lead screw having a traveling nut that is coupled to an endless chain where the endless chain is deployed about a sprocket on an output shaft and a sprocket on an idler shaft, the output shaft being coupled to the rotatable connecting rod of the ladder rack assembly.

DESCRIPTION OF THE DRAWINGS

The foregoing features, objects and advantages of the invention will become apparent to those skilled in the art form the following detailed description of the preferred embodiment, especially when considered in conjunction with the accompanying drawings in which like numerals in the several views refer to corresponding parts.

FIG. 2 is a top elevation view of the drive unit of the present invention;

FIG. 3 is a side elevational view of the drive unit; and

DESCRIPTION OF THE PREFERRED EMBODIMENT

Figure 1:
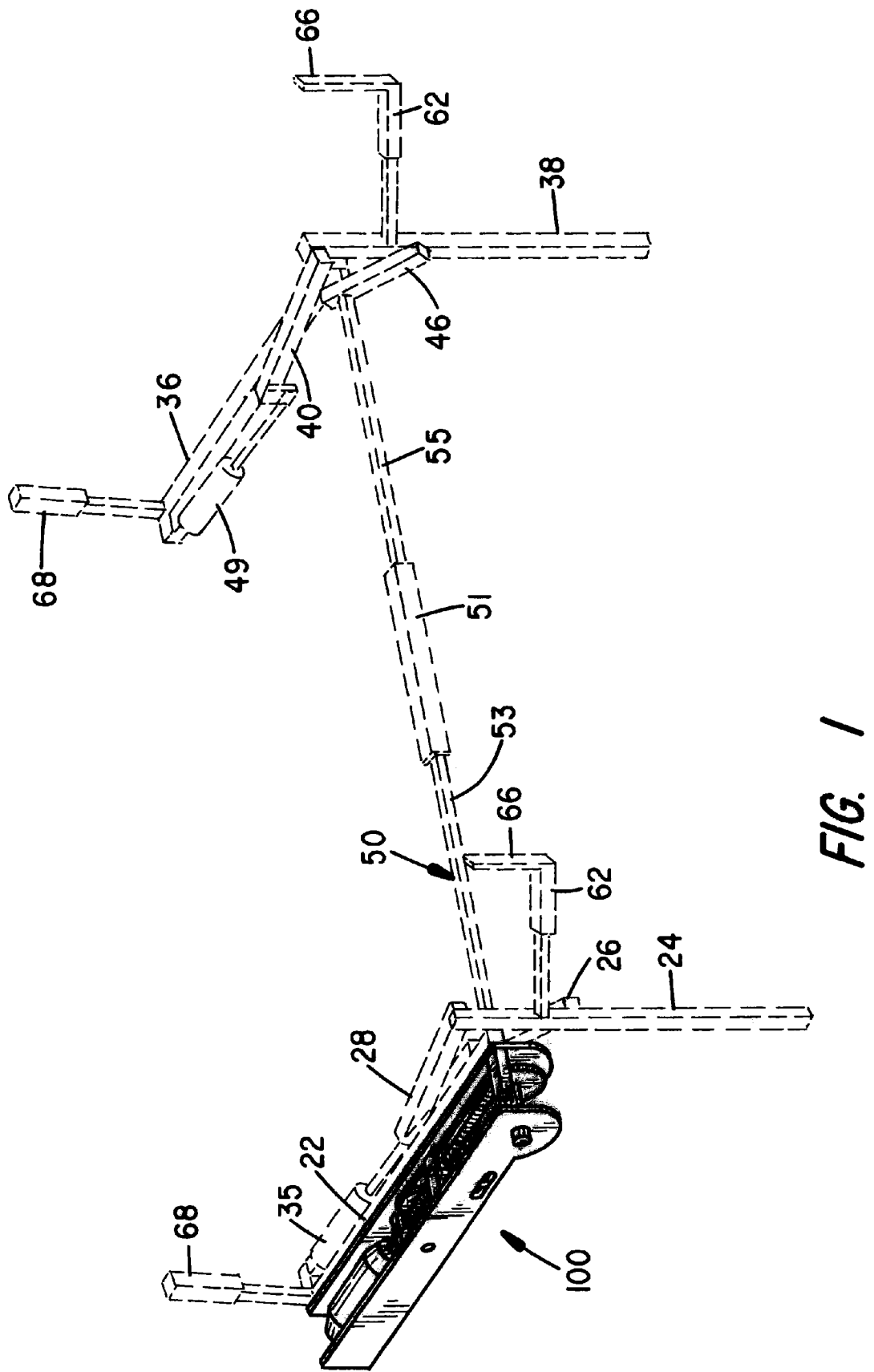
FIG. 1 comprises FIG. 3 of my earlier U.S. Pat. No. 5,297,912, but in phantom line, and illustrating the positioning of the motorized drive unit comprising the preferred embodiment of the present invention secured to the connector rod 50.

Referring first to FIG. 1, there is shown in phantom line the ladder rack of my earlier U.S. Pat. No. 5,297,912. The two digit reference numerals in FIG. 1 are the same as were used in the '912 patent. The present invention provides a mechanism for rotating the connecting rod 50 either clockwise or counterclockwise to raise and lower ladders (not shown) suspended from the arms 62 between a stowed position atop the vehicle to a convenient position alongside the vehicle permitting a person to pick up and carry the ladders or to return them to the rack mechanism.

The motorized drive unit is indicated generally by numeral 100 and is bolted to the transversely extending ladder rack mount member 14 shown in the '912 patent. As will be explained further hereinbelow, the output drive shaft of the power unit 100 connects to the connector rod 50. Because of the design employed, the drive unit 100 has a sufficiently low profile allowing it to be mounted to and be supported by the same mounting rack member to which one of the four-bar linkage assemblies used to deploy the ladder load is attached.

FIG. 2 is a top plan view of the drive unit 100. It is seen to include first and second steel side plates 102 and 104 that are disposed in parallel, spaced-apart relationship to one another. Journaled for rotation in bushings extending through the thickness dimension of the side plates 102 and 104 is an output shaft 106. Affixed to the output shaft and rotatable therewith are first and second parallel, spaced-apart chain sprocket wheels 108 and 110.

Likewise, an idler shaft 112 is journaled for rotation in bushings disposed in the side plates 102 and 104 and the shaft 112 also carries a pair of chain sprocket wheels 114 and 116 thereon. Cooperating with the sprocket wheels 108 and 116 is a first endless chain 118. A second endless chain 120 is deployed about the sprocket wheels 110 and 114. Chain tensioning sprockets 122 and 124 are mounted on a shaft 126 and the bearings therefore are mounted in slots 125 (FIG. 3) formed in the side plates 102 and 104, whereby the rotational axis of the shaft 126 can be shifted longitudinally and locked in place so as to vary the tension in the endless chains 112 and 120.

First and second transversely extending bearing mounting plates 128 and 130 are bolted to the side plate 102 and located in bores formed in the plates 128 and 130 are thrust bearings 132 and 134 for journaling a lead screw 136. Disposed on the lead screw 136 is a traveler nut 138 having a pair of plates 140 affixed to it so as to overlap both sides of the upper flight of the endless chains 118 and 120. Pins, as at 142, pass through links on the two chains so that rotary motion of the lead screw 136 acting on the traveler nut 138 causes both of the endless chains 118 and 120 to be correspondingly moved so as to impart a translational motion to the chains and a rotational motion to the output shaft 106.

A DC motor 144 is appropriately mounted to the side plate 102 and its output shaft 146 is coupled to the lead screw 136 to provide the requisite drive force to it. The DC motor 144 may be about ⅙ horsepower and receives it energization from the vehicle's storage battery. A control module 148 has push button switches for controlling "forward", "reverse" and "stop" motions of the motor 144. The cable 150 connecting the control box 148 to the motor is of a convenient length to permit the operator to stand along side the vehicle and control the deployment of the ladder load.

FIG. 3 is a side elevational view with the side plate 104 removed to better illustrate the location and orientation of the chain sprockets 108, 116 and 122 and that of the lead screw 136.

With no limitation intended and strictly for purposes of illustration, the lead screw 136 may be about 18 inches in length with the overall assembly being about 30 inches in length. Using a ⅙ horsepower motor, sufficient torque is generated at the output shaft 106 to rotate the connecting rod 50 of the ladder rack assembly such that a ladder load of from 120 pounds to 160 pounds can be raised from the roof of the vehicle and placed along side the vehicle in a time of about 14 seconds. Because of the mechanical advantage afforded by the lead screw and traveling nut arrangement, a much smaller DC motor may be used than would otherwise be required if that motor were made to directly drive the shaft 106.

Figure 4:
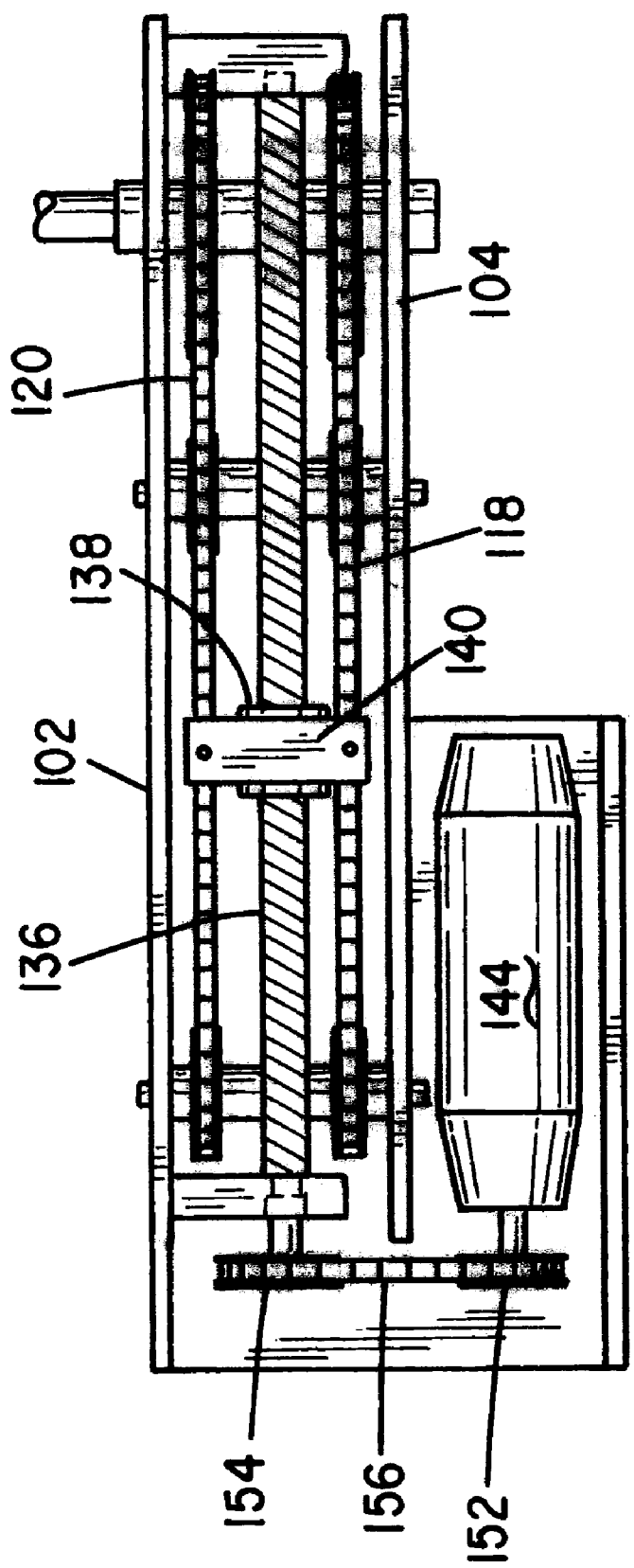
FIG. 4 is an alternative embodiment of the drive unit.

FIG. 4 is a top elevational view of an alternative embodiment of the present invention. To shorten the overall length of the drive assembly, the DC motor 144 may be positioned parallel to the axis of the lead screw 136 rather than in line with it by providing sprocket wheels or pulleys 152 and 154 on the output shaft of the motor 144 and on the lead screw 136, respectively. An endless chain 156 is deployed about the sprockets 152 and 154.

This invention has been described herein in considerable detail in order to comply with the patent statutes and to provide those skilled in the art with the information needed to apply the novel principles and to construct and use such specialized components as are required. However, it is to be understood that the invention can be carried out by specifically different equipment and devices, and that various modifications, both as to the equipment and operating procedures, can be accomplished without departing from the scope of the invention itself.

What is claimed is:

1. A motor powered drive for a vehicle mounted ladder rack, the ladder rack being of the type including front and rear four bar linkage assemblies adapted to be affixed to a roof of said vehicle at longitudinally spaced locations and being coupled together by an elongated, rotatably mounted connecting rod, rotation of said connecting rod being effective to displace a ladder supporting linkage of the front and rear four bar linkages from a disposition above and parallel to said roof to a disposition along side and parallel to a side of the vehicle, said motor powered rive comprising:

(a) first and second side plates held in parallel spaced relation and with front and rear, transversely extending bearing mounting plates affixed to at least one of the side plates;

(b) bearing means disposed in the front and rear bearing mounting plates;

(c) a threaded lead screw journaled at opposed ends thereof in said bearing means and having a traveler nut;

(d) a DC motor coupled in driving relation to said lead screw;

(e) an output shaft journaled for rotation in said first and second side plates at a front end thereof, said output shaft supporting a first pair of chain sprocket wheels thereon;

(f) an idler shaft journaled for rotation in said first and second side plates at a location proximate the rear bearing mounting plate, said idler shaft supporting a second pair of chain sprocket wheels thereon;

(g) first and second endless chains deployed about the first and second pairs of chain sprocket wheels;

(h) means for coupling the traveler nut to the first and second endless chains; and (i) means for coupling said output shaft to the connecting road of the ladder rack.

2. The motor powered drive of claim 1 and further including:

(i) means for adjusting the tension of the first and second endless chains.

3. The motor power drive of claim 1 wherein the DC motor is disposed between the first and second side plates and coupled directly to the lead screw.

4. The motor power drive of claim 1 wherein an output shaft of the DC motor is coupled to the lead screw by a chain and sprocket drive mechanism.

5. The motor power drive of claim 4 wherein the output shaft of the drive motor is disposed parallel to a longitudinal axis of the lead screw.

6. The motor powered drive of claim 1 wherein the DC motor is electrically converted to a battery of the motor vehicle by a cable and a control switch module.

7. A motor powered drive for a vehicle mounted ladder rack of the type having a rotatable connecting rod coupled to a pair of parallel, spaced apart four bar linkages where one linkage of each of the pair of four bar linkages is a ladder support member, the drive comprising a DC motor operatively coupled through a torque amplifying transmission to the rotatable connecting rod.

8. The motor powered drive of claim 7 wherein the torque amplifying transmission comprises:

(a) an output shaft coupled to the rotatable connecting rod, the output shaft being journaled between a pair of parallel, spaced-apart side plates and having a first chain sprocket wheel thereon;

(b) an idler shaft journaled between the pair of side plates at a location displaced a predetermined distance from the output shaft and having a second chain sprocket wheel thereon;

(c) an endless chain deployed about the first and second chain sprocket wheels; and (d) means for driving the endless chain.

9. The motor drive of claim 8 wherein the means for driving the endless chain comprises:

(a) an elongated threaded lead screw journaled for rotation and disposed between the pair of side plates, the lead screw having a traveler nut thereon, the traveler nut being coupled to the endless chain; and (b) a DC motor coupled in driving relation to the lead screw.

* * * * *